(12) United States Patent
Kanagarajan et al.

(10) Patent No.: US 12,195,196 B2
(45) Date of Patent: Jan. 14, 2025

(54) SYSTEMS AND METHODS FOR A USER TO DEFINE A CUSTOM FIX, VIA A GRAPHICAL USER INTERFACE (GUI), FOR OPERATION OF AN AIRCRAFT

(71) Applicant: HONEYWELL INTERNATIONAL INC., Charlotte, NC (US)

(72) Inventors: Sivakumar Kanagarajan, Bangalore (IN); Ethan Williams, Phoenix, AZ (US); Sunil Kumar K S, Bangalore (IN); Hariharan Saptharishi, Madurai (IN); Gobinathan Baladhandapani, Madurai (IN); Srilakshmi Kurudi, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 432 days.

(21) Appl. No.: 17/663,446

(22) Filed: May 16, 2022

(65) Prior Publication Data
US 2023/0365269 A1    Nov. 16, 2023

(51) Int. Cl.
*B64D 43/00* (2006.01)
*G08G 5/00* (2006.01)
*G08G 5/02* (2006.01)

(52) U.S. Cl.
CPC .............. *B64D 43/00* (2013.01); *G08G 5/003* (2013.01); *G08G 5/025* (2013.01)

(58) Field of Classification Search
CPC ......... B64D 43/00; G08G 5/003; G08G 5/025
See application file for complete search history.

(56) References Cited

U.S. PATENT DOCUMENTS

| 7,818,100 B2 | 10/2010 | Goodman et al. |
| 10,430,048 B2 | 10/2019 | Kunes et al. |

(Continued)

FOREIGN PATENT DOCUMENTS

| CN | 208351545 U | 1/2019 |
| CN | 111063220 A | 4/2020 |

OTHER PUBLICATIONS

What's New in ForeFlight Dispatch (Dec. 2020), ForeFlight Intelligent Apps for Pilots, downloaded from: https://blog.foreflight.com/tag/flight-planning/[May 31, 2021 5:53:39 PM].

(Continued)

*Primary Examiner* — Aryan E Weisenfeld
*Assistant Examiner* — Jeffrey R Chalhoub
(74) *Attorney, Agent, or Firm* — Lorenz & Kopf LLP

(57) ABSTRACT

Systems and methods for defining a custom fix via a graphical user interface (GUI) for operation of an aircraft. The method includes uniquely sized and arranged custom fix dialog GUI windows that are displayed on an active avionic display, the custom fix dialog windows having preprogrammed arrangements of GUI objects. The GUI objects allow a user to select between custom airports or custom runways, and to select between create, edit, and store custom fix functions. The method decodes and sequences user input, as related to the displayed GUI objects. Embodiments keep track of required data fields for respective custom fixes, and store custom fix data in a custom database that is compatible with the navigation database and avionic display systems.

20 Claims, 6 Drawing Sheets

(56) References Cited

U.S. PATENT DOCUMENTS

| | | |
|---|---|---|
| 10,540,899 B2 | 1/2020 | Moravek et al. |
| 10,971,021 B2 | 4/2021 | Shorter, Jr. et al. |
| 2013/0332493 A1* | 12/2013 | Snideman ............. G06F 16/211 |
| | | 707/805 |
| 2015/0239574 A1* | 8/2015 | Ball ..................... G08G 5/0052 |
| | | 701/3 |
| 2017/0263137 A1 | 9/2017 | Nostry et al. |
| 2020/0334991 A1* | 10/2020 | Shorter, Jr. .......... G08G 5/0013 |

OTHER PUBLICATIONS

Universal Avionics System Corporation, Operator's Training Manual for FMS and Mmms 1E, 1Esp, 1F, & 1L 1C+, 1Csp+, 1D+, & 1K+ Covering SCN-801, 802, & 803 with Multi Mission Management System (MMMS) 90X Series, Report No. 3040sv80X/90X, Oct. 1, 2009.

Arinc424 Toolkit: "ARINC424 Toolkit Intro", May 25, 2016 (May 25, 2016), XP093087461, Retrieved from the Internet: URL:https://www.youtube.com/watch?v=cGuw2m OihUM [retrieved on Sep. 29, 2023].

\* cited by examiner

SYSTEMS AND METHODS FOR A USER TO DEFINE A CUSTOM FIX, VIA A GRAPHICAL USER INTERFACE (GUI), FOR OPERATION OF AN AIRCRAFT

TECHNICAL FIELD

The following disclosure generally relates to display systems for mobile vehicles. More particularly, the following disclosure relates to systems and methods for a user to define a custom fix, via a graphical user interface (GUI), for operation of an aircraft.

BACKGROUND

During operation of an aircraft, a flight controller or flight management system generally references a navigation database (NavDB) for geographical position information for airports and airport features. "Fix" is a generic name for a geographical position, and in various contexts, a fix may also be referred to as an intersection, a reporting point, a waypoint, or the like.

In common scenarios, the NavDB is a regulated entity. It is generally updated on a prearranged, scheduled, cycle. Each time it is updated, new fixes may be added, and existing fixes may be deleted or modified. A technical problem can occur when a pilot wants to add, delete, or modify an airport or airport feature in real-time, during operation of the aircraft.

Accordingly, improved flight display systems and methods that enable the addition, deletion, and modification, of a fix for operation of an aircraft are desired. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a display system for a user to define a custom fix via a graphical user interface (GUI) for operation of an aircraft. The system includes: a custom database; and a controller circuit in operable communication with the custom database, the controller circuit configured to: render an active avionic display on a multifunction display (MFD) device; display a custom database window on the active avionic display, responsive to a user selection of a custom database tab, the custom database window having a first arrangement of GUI objects, the first arrangement of GUI objects presenting a first GUI object for selecting between custom airports or custom runways, and a second GUI object for selecting between create and edit functions; display a second arrangement of GUI objects within the custom database tab, responsive to receiving a user selection of custom airports and editing on the first arrangement of GUI objects, the second arrangement of GUI objects having an airport tab and an associated airport dialog box, the airport dialog box including a GUI object for a user to select either new or edit, and a unique GUI object for displaying each of: an airport identification, an airport position, and airport bearing, and an airport elevation, and a GUI object to save input; update the airport dialog box responsive to receiving a user selection of new followed by receiving associated user input for each of the airport identification, the airport position, the airport bearing, and the airport elevation, collectively defined as creating a first custom fix; and save the first custom fix in the custom database, responsive to receiving a user selection of save after creating the first custom fix.

Also provided is a method for a user to define a custom fix via a graphical user interface (GUI) for operation of an aircraft, the method including: at a multifunction display (MFD) device, rendering an active avionic display; at a controller circuit in operable communication with the MFD device, receiving user input from a human machine interface (HMI); decoding and sequencing the user input; causing the MFD to display a custom database window on the active avionic display, responsive to a user selection of a custom database tab, the custom database window having a first arrangement of GUI objects, the first arrangement of GUI objects presenting a first GUI object for selected between custom airports or custom runways, and a second GUI object for selecting between create and edit functions; displaying a second arrangement of GUI objects on the custom database window, responsive to receiving a user selection of custom airports and editing on the first arrangement of GUI objects, the second arrangement of GUI objects having an airport tab and an associated airport dialog box, the airport dialog box including a GUI object for a user to select either new or edit, and a unique GUI object for displaying each of: an airport identification, an airport position, and airport bearing, and an airport elevation, and a save button; updating the airport dialog box responsive to receiving the user selection of new followed by receiving associated user input for each of the airport identification, the airport position, the airport bearing, and the airport elevation, collectively defined as creating a first custom fix; and saving the first custom fix in the custom database, responsive to receiving a user selection of save after creating the first custom fix.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

DETAILED DESCRIPTION

Figure 1:
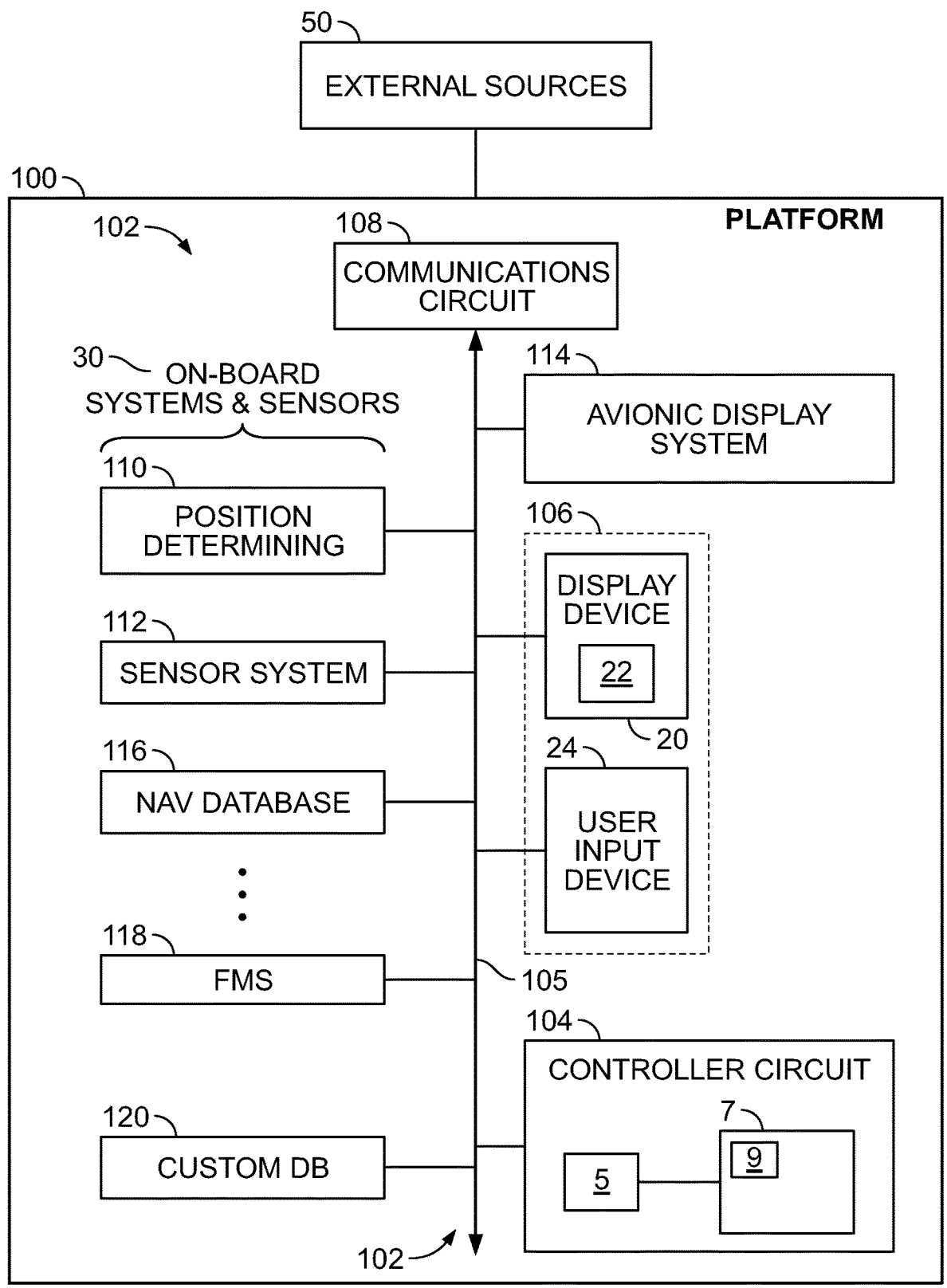
FIG. 1 shows a functional block diagram of an aircraft including various systems, including a system for a user to define a custom fix via a graphical user interface (GUI) for operation of an aircraft, in accordance with exemplary embodiments of the present disclosure.

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

As mentioned, "Fix" is a generic name for a geographical position, and in various contexts, a fix may also be referred to as an intersection, a reporting point, a waypoint, or the like. In operation, aircraft display systems are often limited to displaying the fix information provided by a navigation database (NavDB) that is updated on a prearranged, scheduled, cycle. A technical problem can occur when a pilot wants to add, delete, or modify an airport or airport feature in real-time, during operation of the aircraft.

A technical solution is disclosed herein in the form of systems and methods for a user to define a custom fix via a graphical user interface (GUI) for operation of an aircraft. Proposed embodiments provide a custom database (custom DB 120, FIG. 1) and one or more custom fix dialog box comprising GUI objects, for creating, editing, and deleting a fix during operation of the aircraft. The provided custom DB is configured to accommodate, for a given fix, the type and amount of data relevant to fully define it as it would be in the navigation database, and the provided GUI dialogue box adapts to each type of fix accordingly.

While the following exemplary embodiments are discussed in terms of an aircraft in flight, it should be appreciated that other embodiments may be employed in other contexts that currently rely on a regulated, periodically updated navigation database.

FIG. 1 is a block diagram of a system for a user to define a custom fix via a graphical user interface (GUI) for operation of an aircraft (shortened herein to "system" 102), in accordance with an exemplary and non-limiting embodiment of the present disclosure. The system 102 may be utilized onboard a mobile platform to provide calibration of displayed synthetic images, as described herein. In various embodiments, the mobile platform is an aircraft 100, which carries or is equipped with the system 102. Aircraft 100 may be any type of vehicle that can travel through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft 100 may be "manned" in the conventional sense that the flight crew is present within the aircraft 100, or it may be manned remotely.

As schematically depicted in FIG. 1, system 102 includes the following components or subsystems, each of which may assume the form of a single device or multiple interconnected devices: a controller circuit 104 operationally coupled to: a HMI 106 (human-machine interface); a communications circuit 108; an avionic display system 114; one or more on-board systems and sensors 30; and, the custom DB 120. In various embodiments, the controller circuit 104 communicates with the other components of the system 102 via a communication bus 105.

The human-machine interface, HMI 106, may include a display device 20 and a user input device (UI) 24. In various embodiments, the HMI 106 includes at least one instance of an integration of the user input device 24 and a display device 20 (e.g., a touch screen display). In various embodiments, the HMI 106 may include a user input device 24 such as, any combination of a keyboard, cursor control device, voice input device, gesture input apparatus, or the like.

The avionic display system 114 is configured to receive and process information from various on-board aircraft systems, sensors, and databases (supplied via the communication bus 105), perform display processing and graphics processing, and to drive the display device 20 to render features in one or more avionic displays 22. The term "avionic display" is defined as synonymous with the term "aircraft-related display" and "cockpit display" and encompasses displays generated in textual, graphical, cartographical, and other formats. In various embodiments, the avionic display 22 is a primary flight display (PFD) or a navigation display. In various embodiments, the avionic display 22 can be, or include, any of various types of lateral displays and vertical situation displays on which map views and symbology, text annunciations, and other graphics pertaining to flight planning are presented for a pilot to view.

As is described in more detail below, the avionic display 22 generated and controlled by the system 102 can include graphical user interface (GUI) objects and alphanumerical input/output displays of the type commonly presented on the screens of MCDUs, as well as Control Display Units (CDUs) generally. Specifically, embodiments of avionic displays 22 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

Accordingly, the display device 20 may be configured as a multi-function display (MFD) to include any number and type of image generating devices on which one or more avionic displays 22 may be produced. The display device 20 may embody a touch screen display. When the system 102 is utilized for a manned aircraft, display device 20 may be affixed to the static structure of the Aircraft cockpit as, for example, the aforementioned Head Up Display (HUD) unit, or a Head Down Display (HDD). Alternatively, display device 20 may assume the form of a movable display device (e.g., a pilot-worn display device) or a portable display device, such as an Electronic Flight Bag (EFB), a laptop, or a tablet computer carried into the Aircraft cockpit by a pilot.

In various embodiments, the HMI 106 further includes or has integrated therein an audio system capable of emitting speech and sounds, as well as of receiving speech input. In various embodiments, the HMI 106 may include any of: a graphical user interface (GUI), a speech recognition system, and a gesture recognition system. Via various display and graphics systems processes, the controller circuit 104 and avionic display system 114 may command and control the generation, by the HMI 106, of a variety of graphical user interface (GUI) objects or elements described herein, including, for example, tabs, buttons, sliders, and the like, which are used to prompt a user to interact with the human-machine interface to provide user input, and to activate respective functions and provide user feedback, responsive to received user input at the GUI object.

The on-board systems and sensors 30 generally include a position-determining system 110, a sensor system 112, a navigation database (NavDB) 116, and a flight management system (FMS) 118.

The position-determining system 110 may include a variety of sensors and performs the function of measuring and supplying various types of aircraft status data and measurements to controller circuit 104 and other aircraft systems (via the communication bus 105) during aircraft flight. In various embodiments, the aircraft status data includes, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. The position-determining system 110 may be realized as one or more of a global positioning system (GPS), inertial reference system (IRS), or a radio-based navigation system (e.g., VHF omnidirectional radio range (VOR) or long-range aid to navigation (LORAN)), and it may include one or more navigational radios or other sensors suitably configured to support operation of the aircraft 100.

In some embodiments, the position-determining system 110 may also obtain and/or determine the heading of the aircraft 100 (i.e., the direction that aircraft 100 is traveling relative to some reference) using a magnet compass or a magnetometer, for example. The position-determining system 110 may also include a barometric altimeter such that the position of the aircraft 100 may be additionally determined with reference to a barometric altitude. In some embodiments, the GPS may alternatively or additionally provide altitude information as part of the position-determining system 110. As such, in an exemplary embodiment, the position-determining system 110 is capable of obtaining and/or determining the instantaneous position and altitude of the aircraft 100, and the position-determining system 110 generates aircraft status data for the aircraft, including the current location of the aircraft 100 (e.g., the latitude and longitude) and the altitude and heading of the aircraft 100. The position-determining system 110 may provide this aircraft status data to the controller circuit 104 and the flight management system (FMS) 118 to support their operation, as described herein.

The sensor system 112, as used herein, is a forward-facing sensor system mounted on the mobile platform 100, configured to obtain real-time sensor images. During aircraft operation at an airport, the sensor system 112 provides a sensor image frame depicting airport features surrounding the aircraft position and location. Non-limiting examples of the sensor system 112 include a camera, EVS Infrared, and millimeter wave system. In some embodiments, the sensor system 112 includes a camera and associated circuitry, and the sensor image frame is then a camera image frame. In various embodiments, output from the sensor system 112 additionally includes a frame rate.

In practice, the navigation database 116 and custom DB 120 may be realized as two of two or more different onboard databases, each being a computer-readable storage media or memory. In various embodiments, onboard databases store two- or three-dimensional map data, including airport features data, geographical (terrain), buildings, bridges, and other structures, street maps, including the navigational databases 116. Specifically, the data stored in the navigation database 116 may be regulated and periodically updated, as directed by a regulating entity, whereas the custom DB 120 is managed and updated by the present systems and methods, and is therefore able to adapt to changes more quickly.

FMS 118 provides the primary navigation, flight planning, and route determination and en route guidance for the aircraft 100. The FMS 118 may contribute aircraft status data provided to controller circuit 104, such as, the aircraft's current position, attitude, orientation, and flight direction (e.g., heading, course, track, etc.), the aircraft's airspeed, ground speed, altitude (e.g., relative to sea level), pitch, and other important flight information if such information is desired. In various embodiments, FMS 118 may include any suitable position and direction determination devices that are capable of providing controller circuit 104 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.). FMS 118 and controller circuit 104 cooperate to guide and control aircraft 100 during all phases of operation, as well as to provide other systems of aircraft 100 with flight data generated or derived from FMS 118.

It should be appreciated that aircraft 100 includes many more additional features (systems, databases, etc.) than the illustrated systems 106-118. For purposes of simplicity of illustration and discussion, however, the illustrated aircraft 100 omits these additional features.

External sources 50 may include a weather subscription service, other subscription service, traffic monitoring service, neighbor traffic, air traffic control (ATC), ground stations, and the like.

The term "controller circuit," as appearing herein, broadly encompasses those components utilized to carry-out or otherwise support the processing functionalities of the system 102. Accordingly, in various embodiments, the controller circuit 104 can be implemented as a programmable logic array, application specific integrated circuit, system on a chip (SOC), or other similar firmware, as well as by a combination of any number of dedicated or shared processors, flight control computers, navigational equipment pieces, computer-readable storage devices (including or in addition to memory 7), power supplies, storage devices, interface cards, and other standardized components.

In various embodiments, as depicted in FIG. 1, the controller circuit 104 is realized as an enhanced computer system, having one or more processors 5 operationally coupled to computer-readable storage media or memory 7, having stored therein at least one novel firmware or software program (generally, computer-readable instructions that embody an algorithm) for carrying-out the various process tasks, calculations, and control/display functions described herein. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 5.

During operation, the controller circuit 104, and hence the processor 5, may be programmed with and execute the at least one firmware or software program (for example, program 9, described in more detail below) that embodies an algorithm for receiving, processing, enabling, generating, updating and rendering, described herein, to thereby perform the various process steps, tasks, calculations, and control/display functions described herein.

Controller circuit 104 may exchange data, including real-time wireless data, with one or more external sources 50 to support operation of the system 102 in embodiments. In this case, the controller circuit 104 may utilize the communication bus 105 and communications circuit 108.

In various embodiments, the communications circuit 108 includes the hardware and software to support one or more communication protocols for wireless communication between the processor 5 and external sources, such as satellites, the cloud, communication towers and ground stations. In various embodiments, the communications circuit 108 supports wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 108 supports communication with technicians, and/or one or more storage interfaces for direct connection to storage apparatuses. In various embodiments, the communications circuit 108 is integrated within the controller circuit 104.

Figure 2:
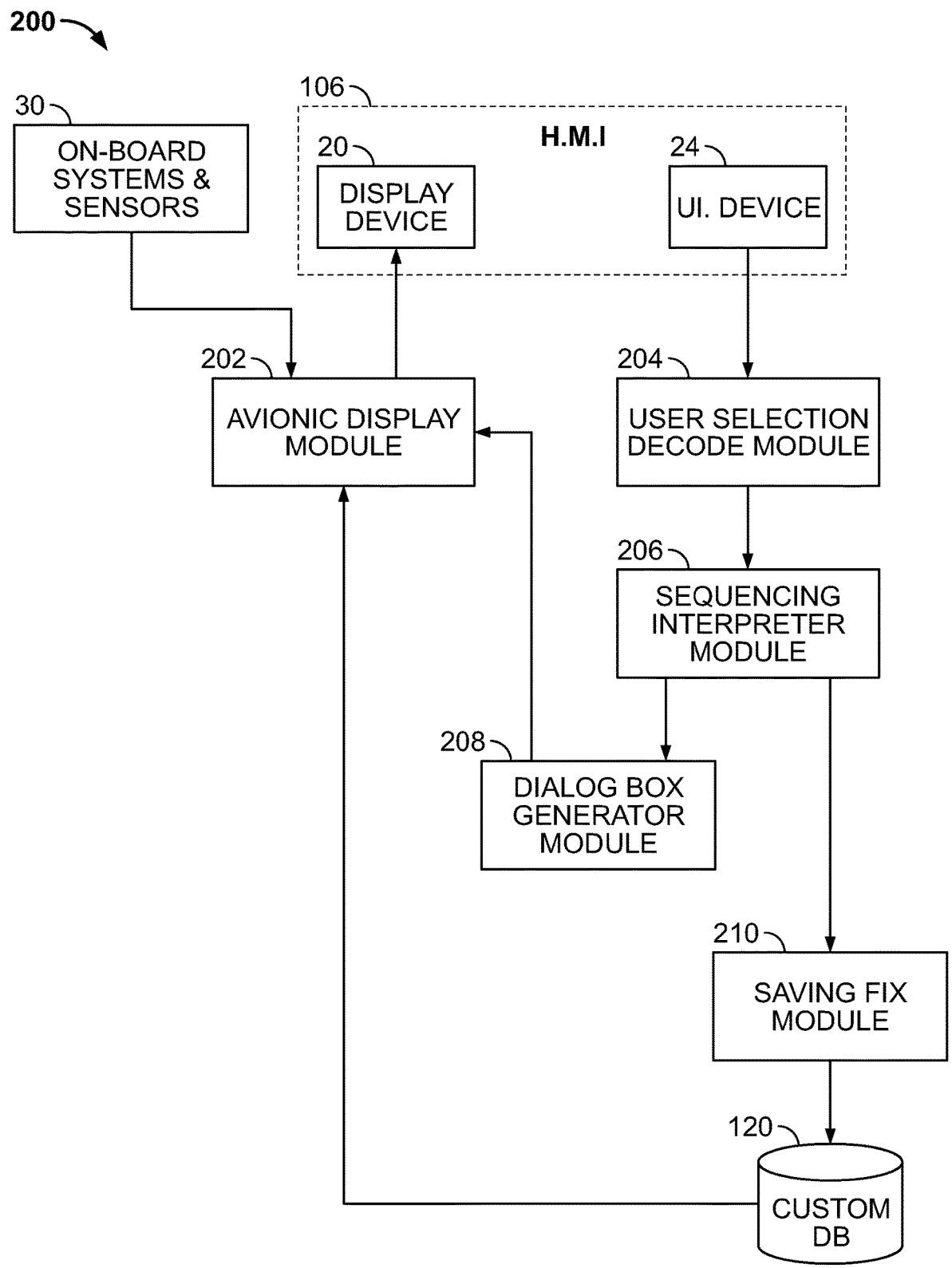
FIG. 2 is an architectural block diagram of one or more application modules that may be operating in the system for a user to define a custom fix via a graphical user interface (GUI) for operation of an aircraft.

Turning now to FIG. 2, and with continued reference to FIG. 1, an architectural block diagram of one or more application modules that may be operating in the system 102 is described. In various embodiments, each application module in FIG. 2 is embodied as a processing block of software (e.g., program 9) that is configured to cause the processor 5 to perform the tasks/processes described herein.

An avionic display module 202, as may be located in the avionic display system 114 on an aircraft, receives, from various on-board systems and sensors 30, an aircraft position, an aircraft attitude and aircraft orientation data, performs the aforementioned display processing and graphics processing, and generates commands and controls to drive the HMI 106 and display device 20 to render features in one or more avionic displays 22, as is conventional. Embodiments of the disclosed avionic display module 202 are enhanced over a conventionally operating avionic display module, with the additional functionality based on receiving and processing input from a dialog box generator module 208 and input from the custom DB 120, as described in more detail hereinbelow. For example, at any given time, the provided avionic display module 202 may render an active avionic display 22 that includes a fix from the custom DB 120 and or a custom database window as described herein.

A user selection decode module 204 receives user selections from the UI device 24. As described herein, the user selections are responsive to various prompts and GUI objects displayed on the display device. The user selection decode module 204 performs decoding of the user input, which means that it receives a user selection and determines when it invokes a custom database window that the system 102 generates.

A sequencing interpreter module 206 performs the function of sequencing, which means that it keeps temporal track of the GUI objects that are displayed and the related user selections that are received to convert the user selection(s) into system 102 functionality, such as, a selected create fix, an edit fix, a function, alphanumeric input, or the like (e.g., a runway, an airport, an edit, identifications and dimensions, a save, etc.). To make the conversion into system 102 function, the user selection is at least compared to a current custom database window (i.e., a window displayed on the display device 20 at the time that the user selection was made).

Accordingly, in various embodiments, a flow of user input (the herein referred to user selections) from the HMI 106 is through the user selection decode module 204 and the sequencing interpreter module 206. Output of the sequencing interpreter module 206 may be a command input for the dialog box generator module 208.

The dialog box generator module 208 commands the avionic display module to display a custom database tab on an active avionic display, and coordinates and commands the display of various selectable GUI objects on the active avionic display. To perform these functions, the dialog box generator module 208 may switch between driving a first arrangement of GUI objects and a second arrangement of GUI objects on the avionic display, based on user selections. The dialog box generator module 208 may also update the first arrangement of GUI objects and/or the second arrangement of GUI objects, responsive to user input flowing from the UI device 24.

The sequencing interpreter module 206 may determine that a user selection has requested that a fix be saved to the custom DB 120. In this instance, a saving fix module 210 may organize the user unput into a string of associated data fields to save the string in the custom DB 120. The string of associated data fields may vary depending on the type of fix. For example, the minimum data fields required for entry of a custom airport fix are Airport identification, position, elevation and magnetic variation. The magnetic variation is automatically populated by the system 102 from a magnetic variation database that is part of the onboard systems and sensors 30. This magnetic variation cannot be modified as like other data. In another example, the minimum data fields required for entry of a custom runway fix are: the runway threshold position, heading, runway touch down zone elevation, runway threshold crossing height and runway length. In various embodiments, a runway fix is further defined by any combination of the following optional data fields: runway width, takeoff/landing threshold and a slope. In various embodiments, runway threshold crossing height, takeoff/landing threshold and slope may have pre-defined default values. The associated airport is automatically populated by the system 102 and cannot be modified.

Figure 3:
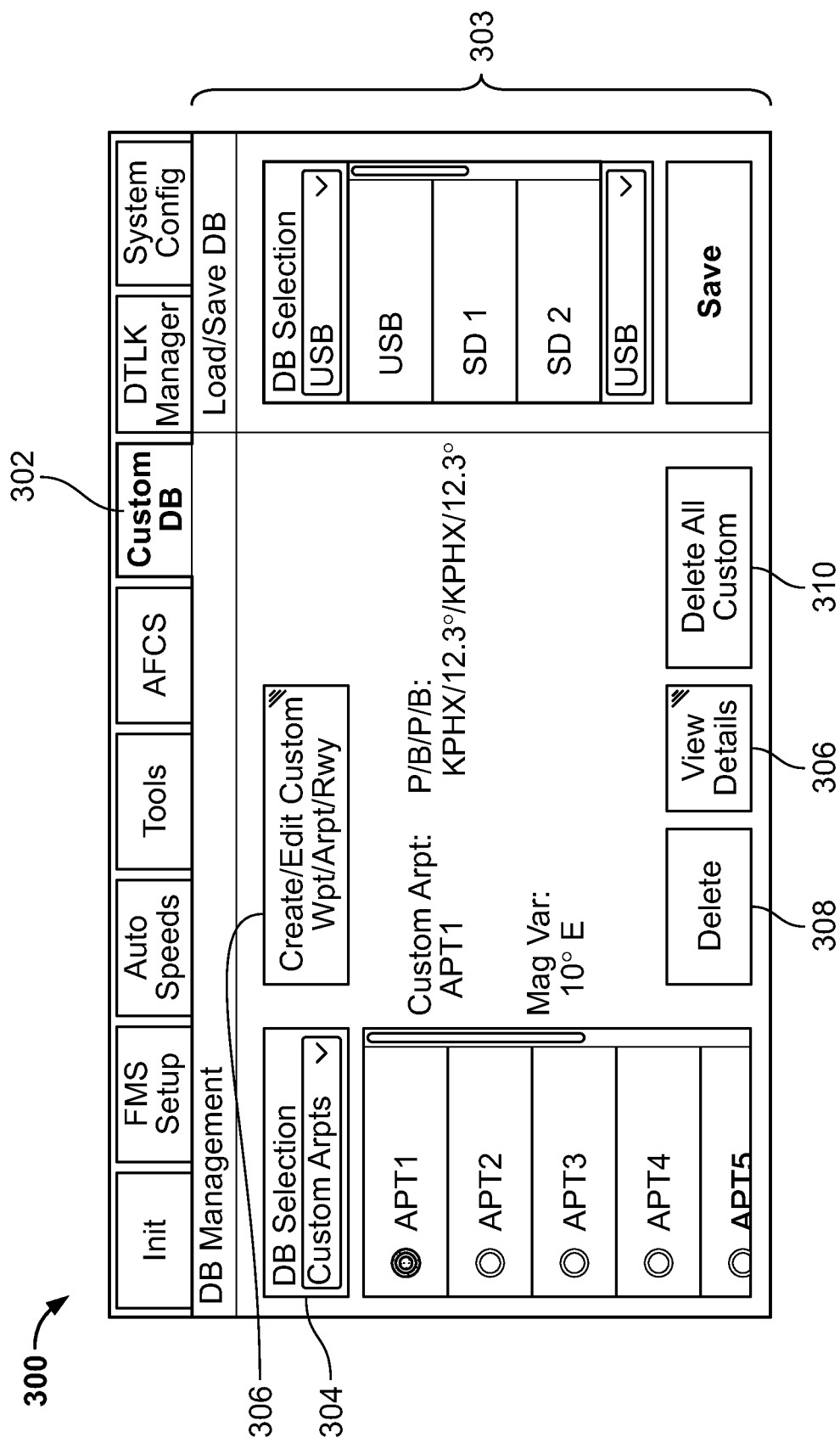
FIG. 3-5 are images depicting various graphical user interface (GUI) displays that may be generated by the system of FIG. 1.
Figure 4:
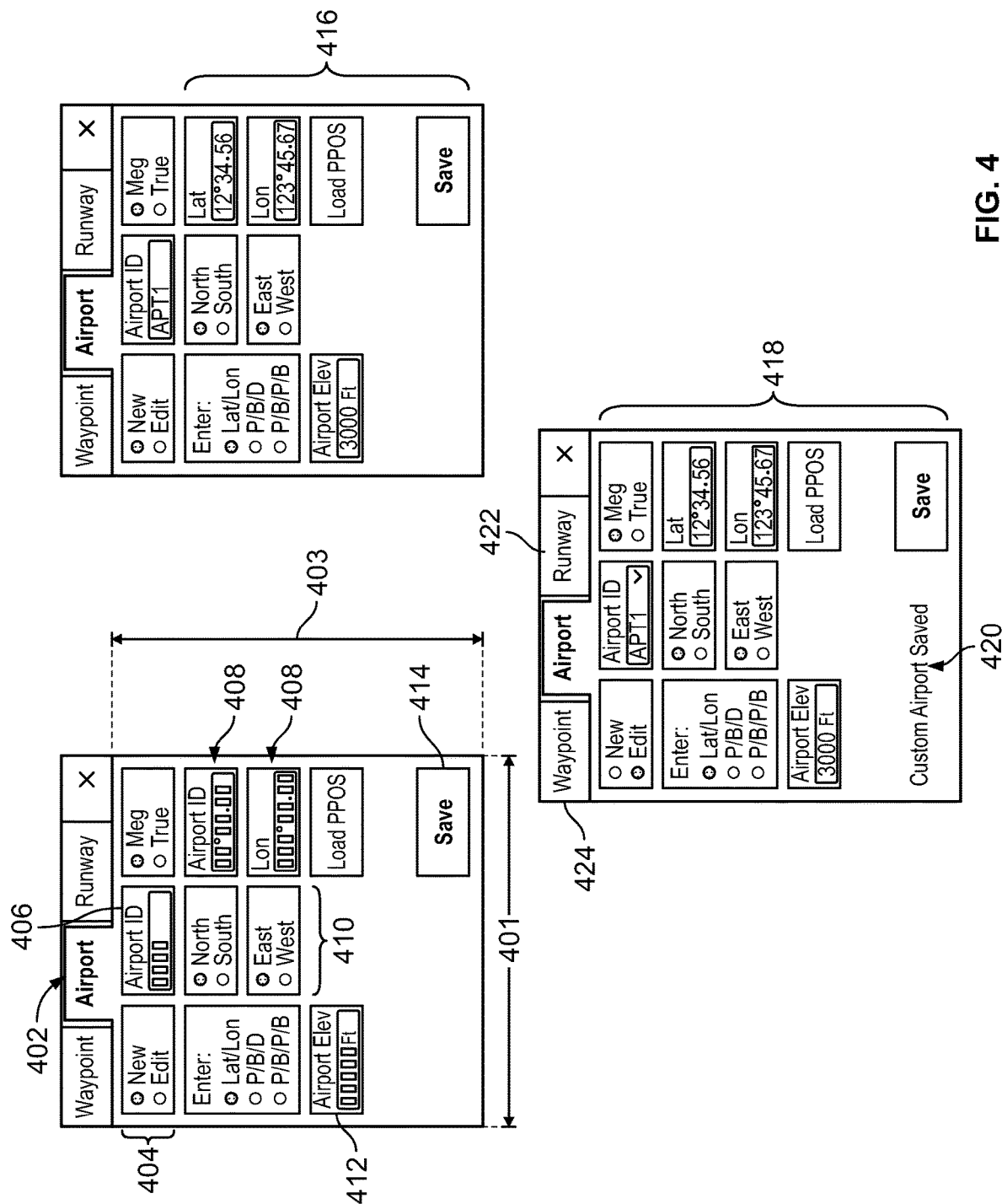
Figure 5:
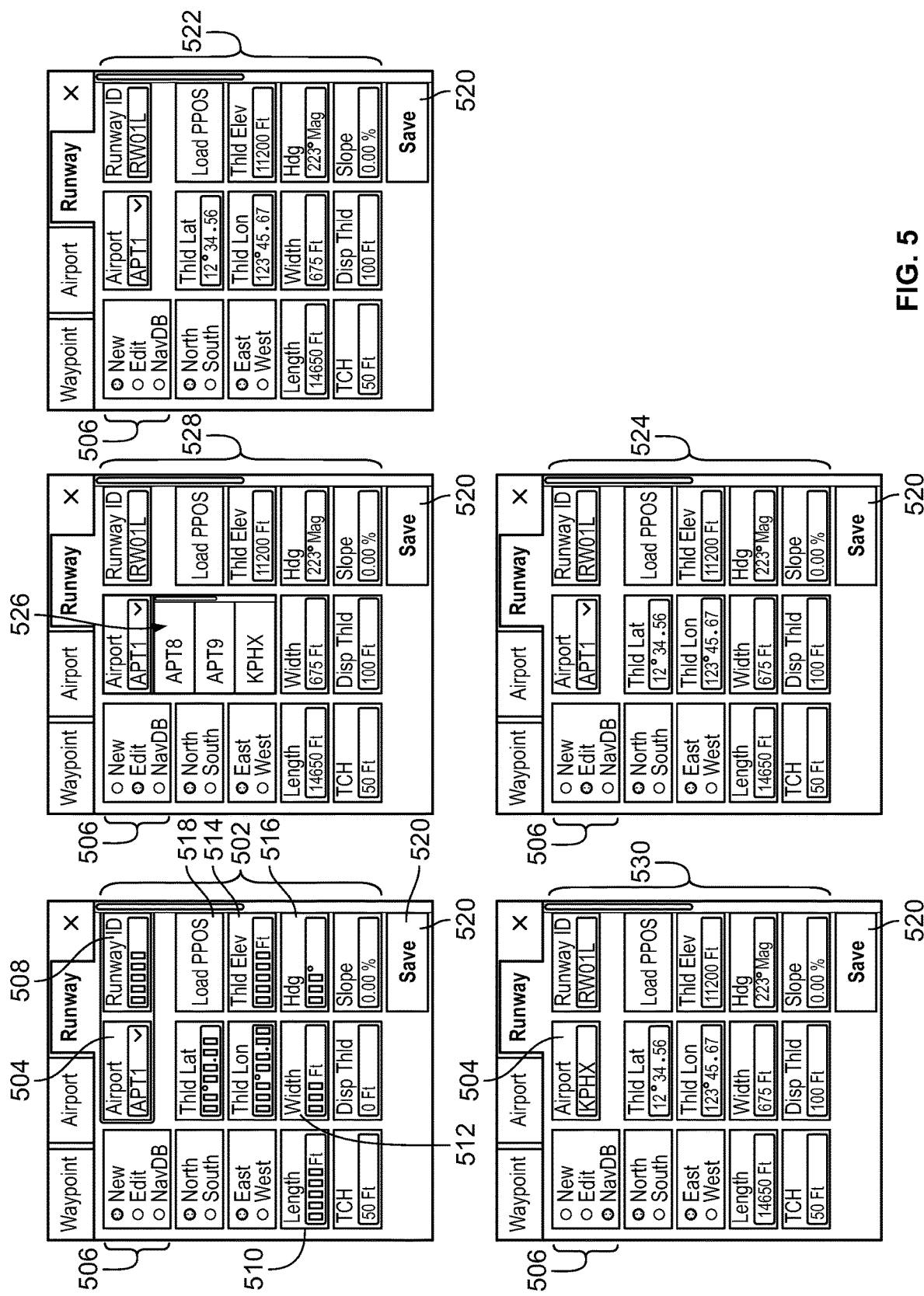

Turning now to FIGS. 3-5, the graphical representation of a custom database tab (FIG. 3, 302) on an active avionic display (FIG. 3, 300) and various selectable GUI objects and their arrangements are illustrated. While the images in FIGS. 3-5 are not to scale, the relative sizes and locations of the GUI objects is deliberate and can be relied upon. The arrangement of the GUI objects has been designed to be easy on the eye for a user, the labels are designed to enhance speed and ascertainment of associated functions. Additionally, provided embodiments employ an algorithm that has specific sequencing to enhance ease of use and cognition by the pilot. Collectively, these aspects of the present disclosure deliver an objectively improved HMI 106.

In FIG. 3, an active avionic display 300 is rendered on a multifunction display (MFD) device, the avionic display having a custom database tab 302. Responsive to receiving a user selection of the custom database tab 302, the system 102 renders a custom database window 303 having a first arrangement of GUI objects. The first arrangement of GUI objects presenting a first selectable GUI object 304 for selecting between a custom airport and a custom runway. In various embodiments, a second selectable GUI object 306 further enables selecting between "create" and "edit" functions for a custom fix (in the example, GUI object 306 is labeled, "create/edit custom Wpt/Arpt/Rwy"). In various embodiments, the custom database tab 302 also includes a "view details" button 306, a "delete" button 308, and a "delete all custom fixes" button 310. Responsive to a user selection of "custom airports" with GUI object 304, the delete button 308 may further be demarked "delete airport", and the delete all custom button 310 may further be demarked "delete all custom airports."

Responsive to receiving a user selection of GUI object 304, the system 102 displays a second arrangement of GUI objects in the custom database window, the second arrangement of GUI objects having an airport tab 402 and an associated airport dialog box, the airport dialog box extends a width 401 and a height 403, which the system 102 will scale to a viewing area on the display device 20. The airport dialog box includes a GUI object 404 for a user to select either new or edit, and a unique GUI object for displaying each of: an airport identification 406, an airport position (Lat and Lon) 408, an airport bearing 410, and an airport elevation 412. The airport dialog box further including a GUI object to "save" 414.

The second arrangement of GUI objects comprises three columns of rectangular buttons. The three columns have equal width, and all buttons extend essentially across the width of the column that they are in. When buttons have multiple functionalities, ins some embodiments, the multiple functionalities may be toggled between by user input, such as, by selecting the button multiple times. For example, selecting GUI object 404 once may activate the "new" functionality and the system 102 may display a visual icon (a radio button of a highlighted color, in the example) to show that "new" is selected. Selecting GUI object 404 a second time may activate the "edit" functionality and the system 102 may display a second visual icon (a radio button of a highlighted color, in the example) to show that "edit" is selected.

In an example, the system 102 receives a user selection of new at GUI object 404. The system 102 updates the airport dialog box in the custom database window (see, 416) responsive to receiving associated user input for each of the airport identification, the airport position, the airport bearing, and the airport elevation, this is referred to or defined herein as creating a first custom fix. In the example, the system 102 receives a user selection of save 414 after creating the first custom fix and updating the dialog box accordingly. The system 102 then saves this user input custom airport. The updated airport dialog box 418 displays a message 420 that alerts the user that the custom airport was saved. Saving the custom fix means saving it in the custom DB 120. Recall, the avionic display module 202 has access to the custom DB 120.

In various embodiments, the second arrangement of GUI objects further includes a runway tab 422. In various embodiments, the second arrangement of GUI objects further includes a waypoint tab 424. Responsive to receiving a user selection of the runway tab 422, the system 102 displays a runway dialog box 502 on the custom database window.

The runway dialog box 502 comprises an arrangement of the following selectable GUI objects: a GUI object for an associated airport 504, a GUI object 506. In various embodiments, GUI object 506 enables a user to select between new, edit, and navigation database (NavDB) options. In other embodiments, the GUI object 506 enables a user to select between new and edit options. The runway dialog box 502 comprises a unique GUI object for displaying each of: a runway identification 508, a runway length 510, a runway width 512, a runway elevation 514, a runway heading 516, and a runway threshold position 518. The runway dialog box 502 further includes a selectable GUI object 520 to save entries as a custom fix.

In an example, the system 102 updates the runway dialog box 522 on the MFD device 20 responsive to receiving a user selection of new, and a user selection of an associated airport ("APT1" in FIG. 5), followed by associated user input for each of the runway identification, the runway length, the runway width, the runway elevation, the runway heading, and the runway threshold position, which is referred to as creating a second custom fix, the second custom fix being the runway RW01L in FIG. 5. Responsive to receiving a user input of save 520, the system 102 saves the second custom fix to the custom DB 120. It may be appreciated that, while the example has a custom airport as a first custom fix and a custom runway as a second custom fix, in practice these can be in the opposite order, and the terms "first" and "second" are only used to distinguish them from each other.

A user can also edit the saved custom runway (or second fix), by selecting edit in the GUI object 506. After selecting edit, the user may change the associated airport by selecting the GUI object for an associated airport 504, which, in the example, opens as a pull down or scroll window (GUI object 526 in runway dialog box 528). In the example provided, the user intends to edit the newly created runway RW01L (the second custom fix in this example) by associating it with "KPHX" as the airport. The system 102 updates the runway dialog box 528 on the avionic display responsive to user input edits, these actions are collectively referred to as editing the second custom fix. Responsive to receiving a user selection of save 520, the edited second custom fix is saved to the custom DB 120.

From the runway dialog box, a user can also create the new custom runway for an existing NavDB airport by selecting NavDB in the GUI object. After selecting NavDB, a user can also create or edit a new custom runway as a custom fix 16 for an existing NavDB airport with the system 102. In an example, by selecting NavDB in the GUI object 506, selecting/updating the airport, and editing the runway data fields in the runway dialog box 530, these actions are then followed by the user entered edits and user selection of "save." In the example, the system 102 saves the custom fix displayed in runway dialog box 530, as associated with the updated airport, in the custom database 120.

In an example, the system 102 receives a user selection of the NavDB option, after having performed the updating to the runway dialog box with the second custom fix; next, the system 102 receives a user edit to an airport field in the runway dialog box, the user edit changing a NavDB airport to an updated airport; next, the system 102 receives a user selection of save after receiving the user edit to the airport field in the runway dialog box; and then, the system 102 saves (into the custom DB 120) the second custom fix as a new runway at the updated airport, responsive to the user selection of save.

Returning to FIG. 3, and with continued reference to FIGS. 4-5, the system 102 enables a user to delete a custom fix from the custom DB 120 by selecting the GUI object delete button 308. In various embodiments, responsive to a user selection of the delete button, the system 102 may render a query asking the user to confirm the delete request by selecting a GUI object confirm button. In various embodiments, responsive to a user selection of the "view details" button 306, the system 102 displays, on the first arrangement of GUI objects, an alphanumeric field presenting custom airport or custom runway information. The system 102 also enables a user to delete all of the custom fixes created by selecting the GUI object 310. The system 102 will clear contents of the custom DB 120 responsive to the user selection of the delete all custom fixes GUI object. In various embodiments, the system 102 may prompt the user to confirm the delete all request before proceeding to clear the contents of the custom DB 120.

In various embodiments, the avionic display 22 may be a waypoint list window, an instrument navigation (INAV) display, and a flight planning display. Provided embodiments of the system 102 support each of these avionic displays 22; the system 102 performs the above described processing steps and once the custom fix dialog box is invoked (i.e., the runway dialog box, e.g. 502, or airport dialog box e.g., 416), the system 102 will display the custom fix dialog box and respond to user selections, and the sequences of user selections, as described above.

For example, on a waypoint list window of the MFD, the system 102 may display an "amend route" option in a waypoint task drop-down menu. From there, the user may define a custom runway (for example, "RW01L") in a temporary flight plan; responsive to this, the system 102 overlays a custom fix box for RW01L on the displayed waypoint list. The custom fix box for RW01L has the same look and arrangement of GUI objects as what has been described above, e.g., the runway dialog box 502. Responsive to the user activating the temporary flight plan once it has been created with the custom runway, the system 102 inserts the custom runway into the active flight plan as an en route waypoint. On the waypoint list, a pilot can use a "change destination" option displayed by the system 102 to change the active destination to a new custom runway.

Likewise, on an INAV display, the system 102 may display a "Show" function key, which when selected, opens a "show" dialog box. The pilot may define a new runway by entering a runway identifier in an "enter identifier" field in the "show" dialog box. Responsive to this, the system 102 again overlays or renders the custom fix box, and the user proceeds to define the custom runway in the custom runway dialog box generated by the system 102, as described in connection with the other avionic displays 22, above. Likewise, the system 102 may generate and overlay the various custom dialog boxes on a flight plan avionic display.

Figure 6:
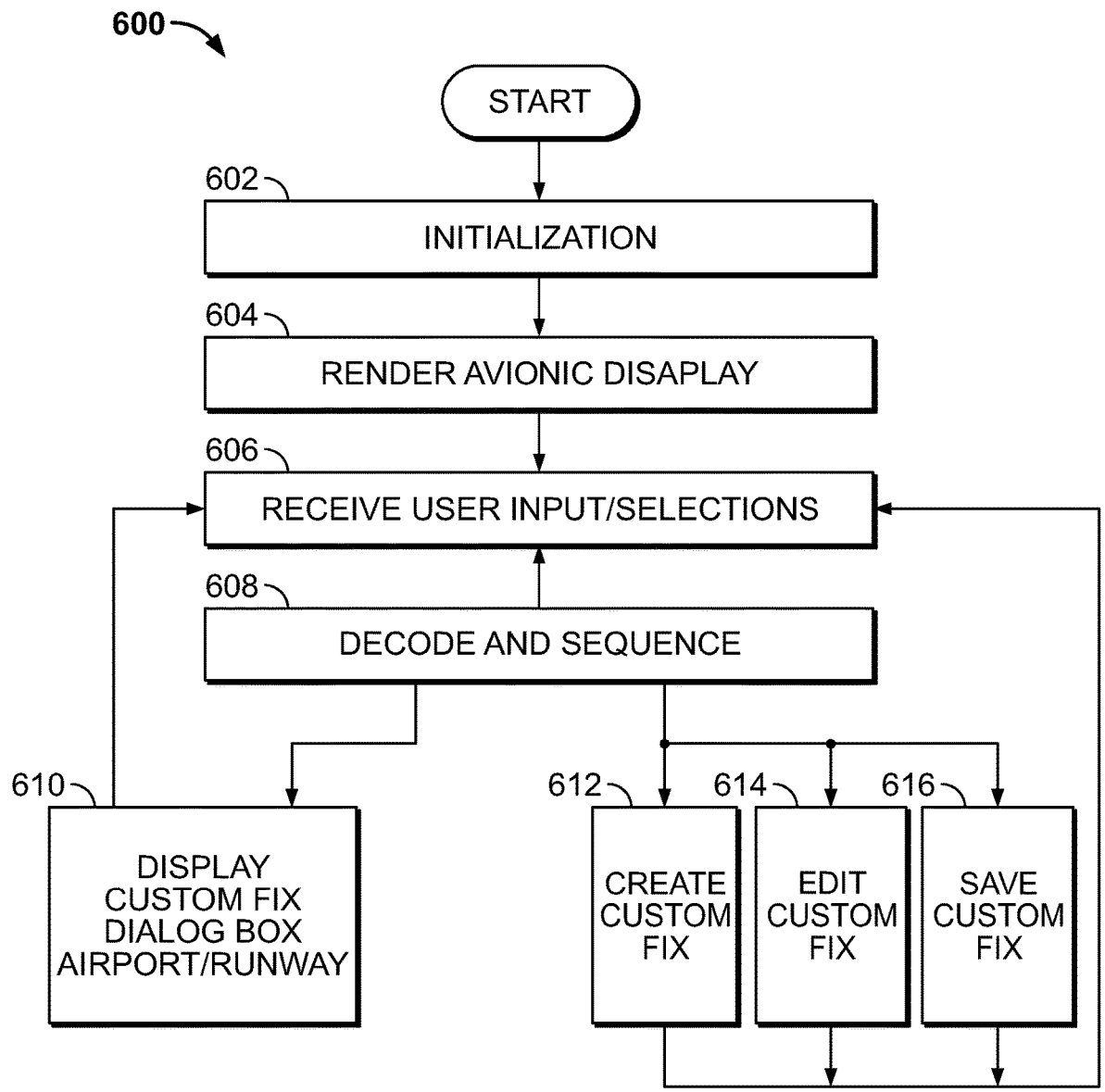
FIG. 6 is a flowchart illustrating a method for a user to define a custom fix via a graphical user interface (GUI) for operation of an aircraft, in accordance with exemplary embodiments of the present disclosure.

Turning now to FIG. 6, and with continued reference to FIGS. 1-5, a flowchart of a method 600 for calibrating a synthetic image on an avionic display in a cockpit of an aircraft is described, in accordance with exemplary embodiments of the present disclosure. For illustrative purposes, the following description of method 600 may refer to elements mentioned above in connection with FIGS. 1-5, for example, the tasks/operations may be performed by the controller circuit 104. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

At 602, the system 102 may be initialized. Initialization may include checking subscription status and synchronizing with a remote site that manages the custom DB 120. In various embodiments, having an initialized system 102 implies that previously generated custom fixes, whether by the same pilot or by other pilots, are present at the beginning of flight operation.

At 604, the system 102 is rendering an avionic display. Avionic displays are described above, in connection with the avionic display module 202 and avionic display system 114. Also, as described above, at 604, various embodiments of the system 102 may display a custom database window on the avionic display. The custom database window has a first arrangement of GUI objects, the first arrangement of GUI objects presenting a first GUI object for selected between custom airports or custom runways, and a second GUI object for selecting between create and edit functions. In various embodiments, the display of the custom database window is responsive to a user selection of a custom database tab that was rendered on the avionic display, as shown in FIG. 3.

At 606 the system 102 receives user input and selections from the HMI 106. At 608, as described above, a novel algorithm in the program 9 decodes and sequences the received user input and selections (e.g., by process modules 204 and 206) to determine which custom fix dialog box to display and when/where to save a custom fix. The output from process modules 204 and 206 informs which arrangement of GUI objects is displayed on the avionics display, and which functionality is being performed by the system 102, from among at least: display custom fix dialog 610, create custom fix dialog 612, edit custom fix dialog 614, and save custom fix dialog 616.

At 610, the custom fix dialog box is displayed. The custom fix dialog box may be a custom airport dialog box, as shown in FIG. 4, or a custom runway dialog box, as shown in FIG. 5. At 612, based upon receipt of user input after the custom fix dialog box is displayed, the "create" custom fix dialog box may be generated and displayed. At 614, based upon receipt of additional user input, the "edit" custom fix dialog box is generated, displayed, and updated with respective user input. At 616, responsive to receiving a user selection of save, the custom fix is saved. After 616, the method 600 may either return to 606 or 604, or end.

Accordingly, the present disclosure has provided several embodiments of systems and methods for a user to define a custom fix via a graphical user interface (GUI) for operation of an aircraft. Provided embodiments enable graphical selection and definition of custom fixes and enable the custom fix to be utilized throughout the avionics system and beyond. The provided embodiments of the custom fix windows work across various avionic displays and various cockpit display systems, electronic flight bags (EFBs), head up displays (HUDs) and cockpit mobile applications. Provided embodiments enable custom fixes that have all required characteristics with regard to existing navigation databases supporting runway overrun alerting, such as ROAAS, capability for the custom runways. Provided embodiments enable the possibility of sharing the custom fixes with customers through connectivity technologies. The custom fix windows provided incorporate human factors reviews of the arrangements of the GUI objects and their size and labels. In summary, the disclosed systems and methods provide an objectively improved HMI over available display systems.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A display system for a user to define a custom fix via a graphical user interface (GUI) for operation of an aircraft, the system comprising:
  a custom database; and
  a controller circuit in operable communication with the custom database, the controller circuit configured to:
    render an active avionic display on a multifunction display (MFD) device;
    display a custom database window on the active avionic display, responsive to a user selection of a custom database tab, the custom database window having a first arrangement of GUI objects,
      the first arrangement of GUI objects presenting a first GUI object for selecting between custom airports or custom runways, and a second GUI object for selecting between create and edit functions;
    display a second arrangement of GUI objects within the custom database tab, responsive to receiving a user selection of custom airports and editing on the first arrangement of GUI objects,
      the second arrangement of GUI objects having an airport tab and an associated airport dialog box, the airport dialog box including a GUI object for a user to select either new or edit, and a unique GUI object for displaying each of: an airport identification, an airport position, and airport bearing, and an airport elevation, and a GUI object to save input;
    update the airport dialog box responsive to receiving a user selection of new followed by receiving associated user input for each of the airport identification, the airport position, the airport bearing, and the airport elevation, collectively defined as creating a first custom fix; and
    save the first custom fix in the custom database, responsive to receiving a user selection of save after creating the first custom fix.

2. The system of claim 1, wherein the controller circuit is further configured to, subsequent to updating the airport dialog box:
  receive a user selection of edit in the airport dialog box;
  edit the first custom fix, which is defined as updating the airport dialog box responsive to receiving the user selection of edit followed by an associated user input for one or more of the airport identification, the airport position, the airport bearing, and the airport elevation; and
  save the edited first custom fix, responsive receiving a user selection of save after editing the first custom fix.

3. The system of claim 1, wherein the second arrangement of GUI objects further includes a runway tab, and wherein the controller circuit is further configured to:
  display a runway dialog box on the custom database window responsive to a user selection of the runway tab, the runway dialog box including a GUI object for an associated airport, a GUI object for a user to select between new, edit, and navigation database (NavDB), and a unique GUI object for displaying each of: a runway identification, a runway length, a runway width, a runway elevation, a runway heading, and a runway threshold position;
  update the runway dialog box responsive to receiving a user selection of new and an associated airport, followed by associated user input for each of the runway identification, the runway length, the runway width, the runway elevation, the runway heading, and the runway threshold position, which is collectively referred to as creating a second custom fix;
  receive a user selection of save after the creating of the second custom fix;
  save the second custom fix in the custom database, responsive to the user selection of save.

4. The system of claim 3, wherein the controller circuit is further configured to:
  update the runway dialog box responsive to receiving, subsequent to updating the runway dialog box, a user selection of edit in the runway dialog box and an associated user edit for one or more of the associated airport, the runway identification, the runway length, the runway width, the runway elevation, the runway heading, and the runway threshold position, which is collectively referred to as editing the second custom fix; and
  saving the edited second custom fix into the custom database, responsive to receiving a user selection of save, after editing the second custom fix.

5. The system of claim 1, wherein the active avionic display is a waypoint list.

6. The system of claim 1, wherein the active avionic display is a navigation display.

7. The system of claim 1, wherein the first arrangement of GUI objects further includes a view details GUI object, and wherein the controller circuit is further configured to: display, on the first arrangement of GUI objects, an alphanumeric field presenting custom airport or custom runway information, responsive to receiving a user selection of the view details GUI object.

8. The system of claim 1, wherein the controller circuit is further configured to:
receive a user selection of delete in the airport dialog box; and
delete the first custom fix responsive to receiving the user selection of delete.

9. The system of claim 3, wherein the controller circuit is further configured to:
receive a user selection of the NavDB option, after updating the runway dialog box with the second custom fix;
receive a user edit to an airport field in the runway dialog box, the user edit changing a NavDB airport to an updated airport;
receive a user selection of save after receiving the user edit to the airport field in the runway dialog box; and
save the second custom fix as a new runway at the updated airport, responsive to the user selection of save.

10. A method for a user to define a custom fix via a graphical user interface (GUI) for operation of an aircraft, the method comprising:
at a multifunction display (MFD) device, rendering an active avionic display;
at a controller circuit in operable communication with the MFD device,
receiving user input from a human machine interface (HMI);
decoding and sequencing the user input;
causing the MFD to display a custom database window on the active avionic display, responsive to a user selection of a custom database tab, the custom database window having a first arrangement of GUI objects,
the first arrangement of GUI objects presenting a first GUI object for selected between custom airports or custom runways, and a second GUI object for selecting between create and edit functions;
displaying a second arrangement of GUI objects on the custom database window, responsive to receiving a user selection of custom airports and editing on the first arrangement of GUI objects,
the second arrangement of GUI objects having an airport tab and an associated airport dialog box, the airport dialog box including a GUI object for a user to select either new or edit, and a unique GUI object for displaying each of: an airport identification, an airport position, and airport bearing, and an airport elevation, and a save button;
updating the airport dialog box responsive to receiving the user selection of new followed by receiving associated user input for each of the airport identification, the airport position, the airport bearing, and the airport elevation, collectively defined as creating a first custom fix; and
saving the first custom fix in the custom database, responsive to receiving a user selection of save after creating the first custom fix.

11. The method of claim 10, further comprising, subsequent to updating the airport dialog box:
editing the first custom fix, which is defined as updating the airport dialog box, responsive to receiving a user selection of edit in the airport dialog box, followed by an associated user input for one or more of the airport identification, the airport position, the airport bearing, and the airport elevation; and
saving the edited first custom fix, responsive receiving a user selection of save after editing the first custom fix.

12. The method of claim 10, wherein the second arrangement of GUI objects further includes a runway tab, and further comprising:
displaying a runway dialog box on the custom database window, responsive to a user selection of the runway tab, the runway dialog box including a GUI object for an associated airport, a GUI object for a user to select between new, edit, and navigation database (NavDB), and a unique GUI object for displaying each of: a runway identification, a runway length, a runway width, a runway elevation, a runway heading, and a runway threshold position;
updating the runway dialog box responsive to receiving a user selection of new and an associated airport, followed by associated user input for each of the runway identification, the runway length, the runway width, the runway elevation, the runway heading, and the runway threshold position, which is collectively referred to as creating a second custom fix; and
saving the second custom fix in the custom database, responsive to the user selection of save after the creating of the second custom fix.

13. The method of claim 12, further comprising:
updating the runway dialog box responsive to receiving, subsequent to updating the runway dialog box, a user selection of edit in the runway dialog box and an associated user edit for one or more of the associated airport, the runway identification, the runway length, the runway width, the runway elevation, the runway heading, and the runway threshold position, which is collectively referred to as editing the second custom fix; and
saving the edited second custom fix into the custom database, responsive to receiving a user selection of save, after editing the second custom fix.

14. The method of claim 10, wherein the active avionic display is a waypoint list.

15. The method of claim 10, wherein the active avionic display is a navigation display.

16. The method of claim 10, wherein the first arrangement of GUI objects further includes a view details GUI object, and further comprising:
displaying, on the first arrangement of GUI objects, an alphanumeric field presenting custom airport or custom runway information, responsive to receiving a user selection of the view details GUI object.

17. The method of claim 10, further comprising:
receiving a user selection of delete in the airport dialog box; and
deleting the first custom fix responsive to receiving the user selection of delete.

18. The method of claim 13, further comprising:
receiving a user selection of the NavDB option, after updating the runway dialog box with the second custom fix;
receiving a user edit to an airport field in the runway dialog box, the user edit changing a NavDB airport to an updated airport;
receiving a user selection of save after receiving the user edit to the airport field in the runway dialog box; and
saving the second custom fix as a new runway at the updated airport, responsive to the user selection of save.

19. The method of claim 10, wherein the first arrangement of GUI objects further presents a view details GUI object, and further comprising:
receiving a user selection of the view details GUI object; and
and displaying an alphanumeric field presenting custom airport information.

20. The method of claim 10, wherein the first arrangement of GUI objects further presents a delete all custom fixes GUI object, and further comprising:
receiving a user selection of the delete all custom fixes GUI object; and
clearing the custom DB responsive to the user selection of the delete all custom fixes GUI object.

* * * * *